US006697864B1

(12) United States Patent
Demirtjis et al.

(10) Patent No.: US 6,697,864 B1
(45) Date of Patent: Feb. 24, 2004

(54) LOGIN ARCHITECTURE FOR NETWORK ACCESS THROUGH A CABLE SYSTEM

(75) Inventors: Ann Demirtjis, Redmond, WA (US); Mark T. Jeffrey, Wokingham (GB)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/420,352

(22) Filed: Oct. 18, 1999

(51) Int. Cl.$^7$ .............................................. G06F 15/16
(52) U.S. Cl. ..................................... 709/229; 709/217
(58) Field of Search ................................ 709/217, 218, 709/219, 223, 225, 226, 227, 229, 249, 250

(56) References Cited

U.S. PATENT DOCUMENTS 6,118,768 A * 9/2000 Bhatia et al. ................ 709/250
6,393,484 B1 * 5/2002 Massarani .................... 709/229

OTHER PUBLICATIONS

Egevang, K, and Francis, P, "RFC 1631: The IP Network Address Translator", Internet Engineering Task Force.*
Rekhter, Y., Moskowitz, B., Karrenberg, D., de Groot, G.J., and Lear, E, "RFC 1918: Address Allocation for Private Internets", Internet Engineering Task Force.*
Microsoft Corporation, *Microsoft Windows NT Server: Understanding Point–to–Point Tunneling Protocol (PPTP).* (1997).

* cited by examiner

*Primary Examiner*—Zarni Maung
(74) *Attorney, Agent, or Firm*—Leydig, Voit & Mayer, Ltd.

(57) ABSTRACT

A login architecture for a computer to access an external network, such as the Internet, through a cable network provides session-based connection to the external computer network. The home computer is first assigned a restricted network address by the cable network. With the restricted network address, the user may access a "walled garden" of the cable network, but cannot access the external computer network. To access the external computer network, a session-based connection, such as a "tunnel" under the Point-to-Point Tunneling Protocol, is formed between the home computer and a connection server of the cable network, and the user is authenticated over the session-based connection. A second network address usable for accessing the external network is then assigned to the home computer. The home computer sends network communication packets using the public network address through the session-based connection to the connection provider, which forwards the communication packets to the external computer network. The login architecture may be implemented to provide connection to the external network on a per-user account basis or on a home account basis. In the case whether the external network is the Internet, a selection of Internet service providers (ISPs) for Internet access through the cable network is provided by using multiple connection servers connected to different ISPs.

23 Claims, 8 Drawing Sheets

LOGIN ARCHITECTURE FOR NETWORK ACCESS THROUGH A CABLE SYSTEM

TECHNICAL FIELD OF THE INVENTION

This invention relates generally to providing access to a computer network, and more particularly to the administration of access to a wide-area network, such as the Internet, through a cable system.

BACKGROUND OF THE INVENTION

The Internet is rapidly becoming one of the most important information resources as well as the backbone of electronic commerce. To tap into the vast market of Internet connectivity, various systems have been proposed and implemented to provide Internet access to average households. For example, cable networks, which conventionally were used to provide video services, have been converted to offer broadband data transmission for connecting home computers to the Internet.

Typically, a cable architecture for Internet access includes two different entities: the cable company (often referred to as a Multi-Service Operator ("MSO")) that owns the cable network, and an Internet service provider ("ISP"). The MSO provides cable access to the end user and controls the cable plant connected to the ISP. When a user uses the cable network to access the Internet, the network communication data from the user's computer are first transmitted through the cable network to the cable plant, which then forwards the communication data to the Internet through the Internet service provider.

In order to access the Internet, a home computer has to have an Internet Protocol (IP) address. In existing cable architectures, such an IP address is dynamically allocated by a Dynamic Host Configuration Protocol (DHCP) server of the MSO. In a conventional arrangement, the home computer first makes a connection to the cable plant of the MSO and receives an IP address from the DHCP server. Once the home computer is assigned an IP address, it can access the Internet without further intervention of the cable system.

This conventional arrangement of Internet access through a cable system has several shortcomings. First of all, the IP address for Internet access is assigned to the home computer, not to the user using the computer. The process of connecting the home computer to the Internet does not require information regarding the identity of the user. As a result, the MSO does not know who is accessing the Internet using the assigned IP address. Since the MSO has no knowledge of the identity of the users using its cable system, it is not able to tailor the services it offers to individual users.

Another shortcoming of the conventional cable connection arrangement is that the allocation of IP addresses to home computers for Internet access can result in inefficient use of the IP addresses. IP addresses are a valuable resource, and in some countries there is a shortage of IP addresses. Under the conventional cable connection architectures, however, the allocation of an IP address is not on a need-only basis, i.e., an IP address may be assigned to a computer even if that computer is not being used to access the Internet. Once an IP address is assigned to a home computer, the user may use the computer for other applications or simply leave the computer on, and the MSO does not know whether the user is actually using the IP address for Internet access.

Another shortcoming of existing cable connection architectures is that each MSO typically has connection to only one Internet service provider. As a result, the users are not given a choice of the ISPs they prefer to use but can only accept the ISP associated with the MSO that owns the cable network.

SUMMARY OF THE INVENTION

In view of the foregoing, the present invention provides a login architecture that provides session-based access of an external computer network, such as the Internet or a network providing special services, through a cable system. A computer used to access the external computer network through the cable system is first assigned a restricted network address that enables the computer to access a private network of the cable system. With the restricted network address, a user may access a "walled garden" of the cable system, but cannot access the external computer network. When the user wants to access the external computer network, a session-based connection is formed between the user's computer and a connection server of the cable system, which is connected to the external computer network. The user is authenticated over the session-based connection between the computer and the connection server. After the user is authenticated, a public network address routable through the external network is assigned to the user's computer. The user's computer sends network communication packets using the public network address through the session-based connection to the connection provider, which then forwards the communication packets to the external computer network. The login architecture may be implemented with the user's computer connected directly to a bridging device, such as a cable modem, to the cable network, or with the user's computer being part of a local area network ("LAN") that is connected to the cable system through a gateway computer. The login architecture may be implemented to require each user to have a separate account or require only a single account setup for the LAN. In the case where the wide-area network is the Internet, Internet access through multiple ISPs is provided by employing multiple connection servers connected respectively to different ISPs.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
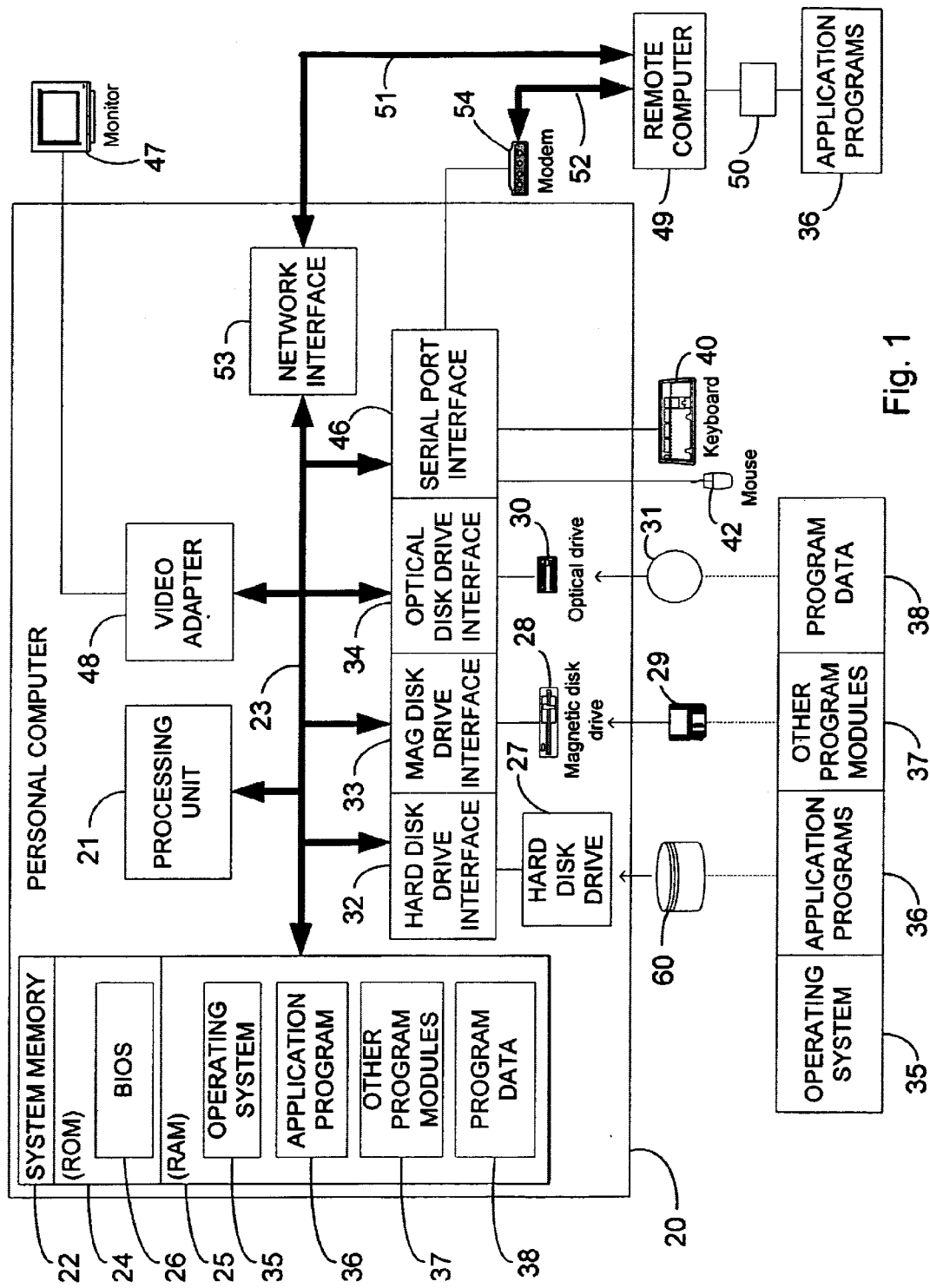
FIG. 1 is a block diagram generally illustrating an exemplary computer system that may use a cable system to access an external network, such as the Internet, according to a login architecture of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means, such as a cable modem connected to a cable network, for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
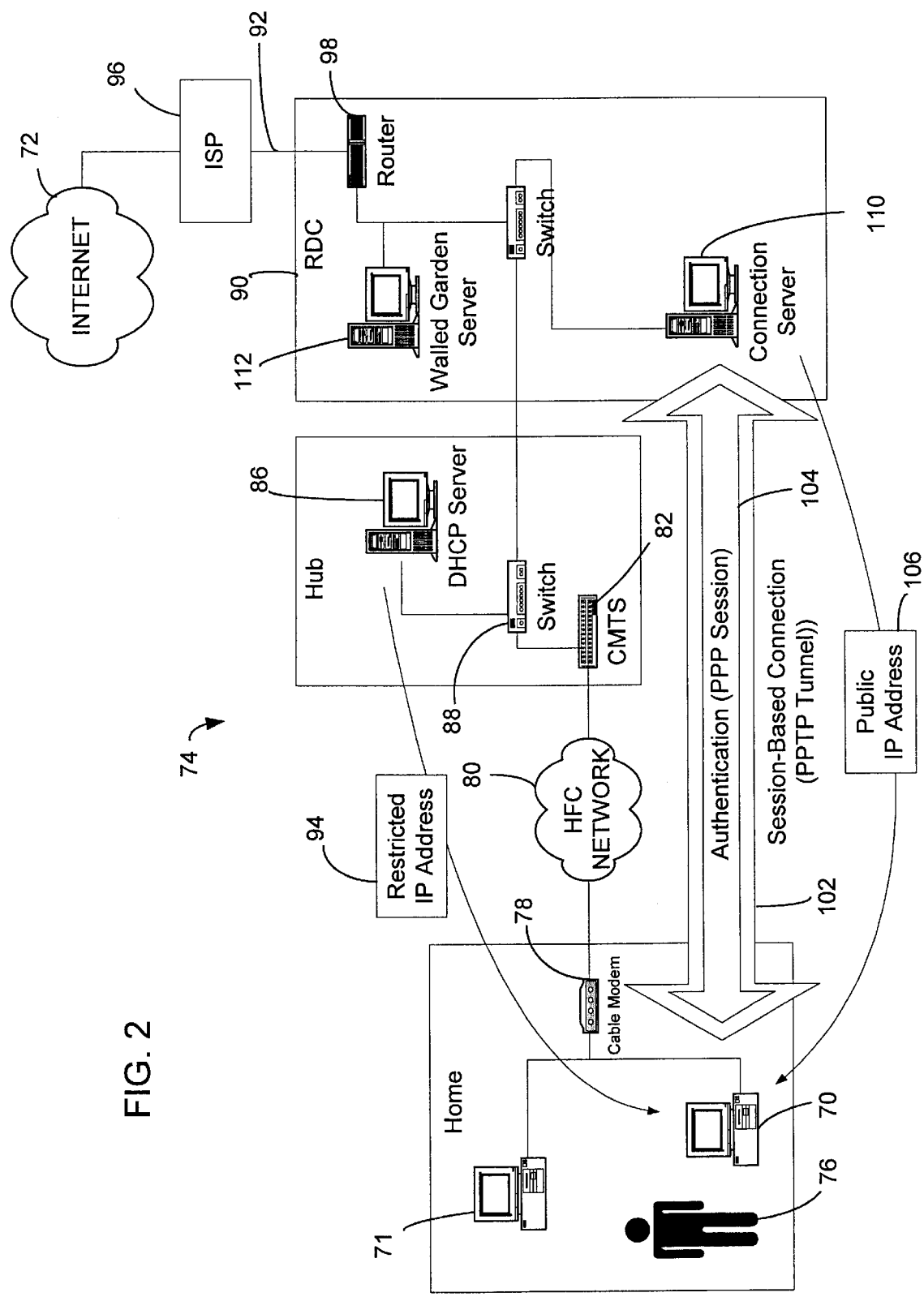
FIG. 2 is a schematic diagram showing an embodiment of the login architecture of the invention for providing Internet access to home computers through a cable system.

Referring now to FIG. 2, the present invention is directed to a login architecture that enables a computer 70 to obtain session-based access to the Internet 72 or another computer network through a cable network 74. In the embodiment shown in FIG. 2, the computer 70 is a home computer operated by a user 76. To enable the home computer 70 to transmit and receive data through the cable network 74, a bridging device, such as a cable modem 78, is provided as the interface between the cable system and the computer. Digital data sent by the home computer 70 is transmitted over a hybrid fiber-coaxial (HFC) cable network 80 to a cable modem termination system (CMTS) 82 that terminates the connection over the cable media.

In the embodiment of FIG. 2, the architecture of the cable network 74 includes a plurality of distribution hubs each serving the service areas within a city or a similar geographic partition. Cities within a geographic region are also linked to each other through a combination of fiber rings and point-to-point links. Each hub 84 contains one or more CMTSs that are connected to respective home computers through the HFC network. The hub 84 also contains a Dynamic Host Configuration Protocol ("DHCP") server 86, which is responsible for allocating network addresses to the home computers as will be described in greater detail below. The hub 84 further includes a switch 88 or router that directs network traffic to a Regional Data Center ("RDC") 90. The RDC 90 aggregates the network traffic from all the cities in the region, and provides connectivity to the Internet 72. In the embodiment of FIG. 2, the Internet connectivity is provided by a dedicated connection 92 from the RDC 90 to an Internet service provider ("ISP") 96. To that end, the RDC 90 includes a router 98 for routing network communications from the computers connected to the cable network to the ISP 96.

To access the Internet 72, the home computer 70 has to have a public IP address that is routable across the Internet. In accordance with a feature of the invention, to gain access to the Internet, the home computer has to first login onto the cable network 74. The login process establishes a session-based connection to the RDC 90, over which the user is authenticated. A public IP address is allocated to the home computer after the user has been authenticated, and network packets for Internet communication is passed through the session-based connection. The user authentication allows the MSO to learn the identity of the user, and the session-based connection allows efficient allocation of public IP addresses by the MSO to computers that use the Internet connectivity provided by the cable network.

In accordance with another fleature of the invention, the login architecture may be implemented either on a per-user account basis or on a home account basis. In the following detailed description, the login architecture is described first in connection with an embodiment in which a home computer is connected to the cable network through a bridging device, such a cable modem. The login architecture is then described in connection with embodiments in which the home computer is part of a home local area network ("LAN") that includes a gateway computer for connection to the cable network. In that system, the login can be implemented either on a per-user account basis or on a home account basis.

FIG. 2 illustrates an embodiment in which home computers 70, 71 are individually connected to a bridging device, such as the cable modem 78, for sending network traffic through the cable network 74. In this embodiment, access to the Internet is given on a per-user account basis, i.e., each user has to set up an account with the MSO to use the Internet connection service. In this regard, there may be multiple computers at the user's premises, each connected to the cable network through the cable modem. The user may use either computer to access the Internet through the cable network.

Before the user 76 uses the home computer 70 to access the Internet, the home computer is assigned a restricted IP address 94 from the DHCP server 86 of the MSO. This restricted IP address is not routable through the Internet and is therefore not usable for accessing the Internet, but may be used to access a private network of the MSO. Which part of the private network may be accessed using the restricted IP address depends on the design of the cable system. For instance, the restricted IP address may allow the home computer 70 to be connected to selected servers on a private network of the cable computer for a variety of services not accessible to the Internet. Such services provided by the private network are commonly referred to as a "walled garden," as only the users of the cable network are allowed to browse within the boundary of the selected servers. Alternatively, the restricted IP address may be from a subnet of the MSO that provides no access at all without a login by the user. In this case, the only server the home computer can reach is a connection server for connection to an external network, such as the Internet, as will be described in greater detail below.

A significant advantage of the walled-garden services of the cable network over the walled-garden services offered by some Internet service providers is the broadband transmission capability of the cable media. The broadband transmission allows the cable network to provide services requiring high transmission rates without negatively impacting the capacity of the backbone to the Internet. For instance, the walled-garden services may include multimedia servers carrying video and audio signals for advertising, live broadcasts, pay-per-view video-on-demand services, etc. The use of the restricted IP address provides the MSO the flexibility in designing the services it wants to offer to customers of its cable network without first logging in.

For purposes of establishing Internet access by the home computer, the restricted IP address allocated to the computer 70 allows the home computer to access at least a connection server 110 of the cable system. When the user wants to access the Internet 72, she starts a login sequence in which a session-based connection 102 with the connection server 110 is established. Over this session-based connection, the connection server 110 authenticates the user 76. When the user is authenticated, the connection server 110 obtains a public IP address 106 from the DHCP server and gives it to the home computer 70. With the public IP address, the home computer 70 can now access the Internet.

In accordance with a feature of the invention, the Internet access by the user 76 of the home computer 70 is through the session-based connection 102 established with the connection server 110. Specifically, the home computer 70 constructs IP communication packets using the public IP address 106 it received and sends the packets to the connection server 110 through the session-based connection 102. The connection server 110 then forwards the received packets to the ISP 96 through the router 98. When the connection server 110 receives from the ISP 96 network packets from the Internet 72 for the home computer 70, it sends the packets through the session-based connection 102 over the cable network to the home computer.

In a preferred embodiment, the session-based connection 102 is formed under the widely used Point-to-Point Tunneling Protocol ("PPTP"). Such a connection formed under the PPTP is commonly referred to as a "tunnel." It will be appreciated that a communication "tunnel" between two computers may also be formed under other protocols. Generally, the formation of a communication tunnel allows one computer to communicate with another computer across a public network as if the two computers were in the same private network. Such network communications over a communication tunnel is also often referred to as a "virtue private network." It will be appreciated, however, that in the embodiment of FIG. 2 the communication tunnel is used in a way significantly different from the conventional way of using tunnels. Specifically, the tunnel in the login architecture embodiment of FIG. 2 is across a private network, namely the cable network, for access of another network which may be a public network, such as the Internet.

In the embodiment of FIG. 2, the PPTP session starts from the home computer 70 of the user 76 and terminates on the connection server 110 in the MSO's private network. A Point-to-Point Protocol ("PPP") session 104 is created within the PPTP tunnel 102 to allow the connection server to authenticate the user based on, for example, the user's name and password. In a preferred embodiment, once the user is authenticated, the connection server 110 obtains a public IP address from the DHCP server 86 and gives it to the computer 70 for use in Internet access within that session. Alternatively, the IP address may be statically assigned instead of using the DHCP server.

Figure 3:
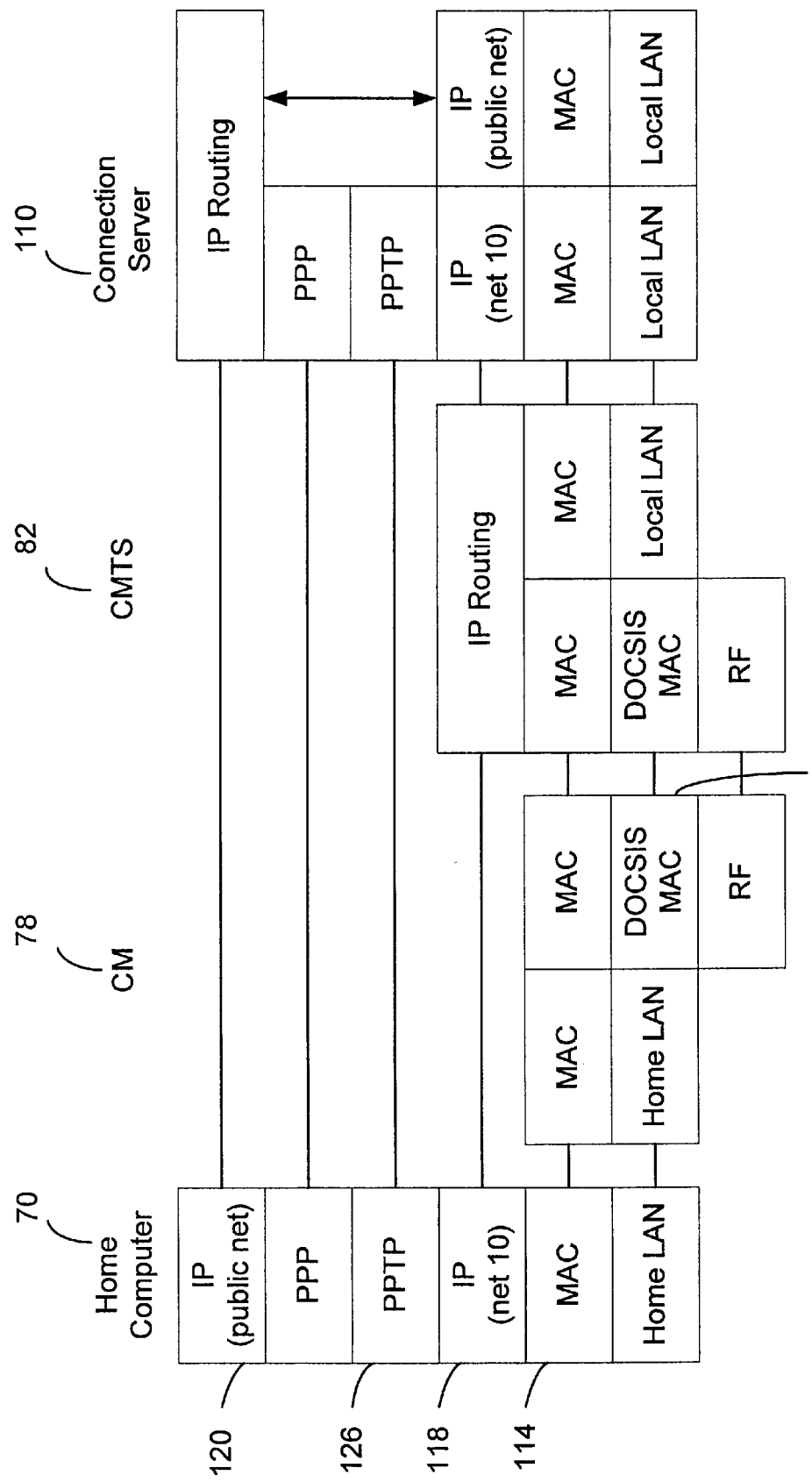
FIG. 3 is a schematic diagram showing protocol stacks for transmitting network communication packets through the cable system of FIG. 2.

FIG. 3 shows the protocol stack for the home computer to communicate with the Internet through the PPTP tunnel between the home computer 70 and the connection server 110. This protocol stack implements the Data Over Cable Service Interface Specifications ("DOCSIS") known to those skilled in the art. DOCSIS is a set of technical documents written by the cable community to standardize the architecture for IP-based services over the cable network. This standard defines a Medium Access Control ("MAC") layer 114 and an IP layer 118 that are components of the protocol stack required for a cable modem ("CM") to initialize with its cable modem termination system ("CMTS"). In the DOCSIS architecture model, the home computer generates IP over Ethernet packets. The cable modem 78 acts as a bridge and forwards the Ethernet frames to the cable network. DOCSIS specifies a new MAC layer 116 from the CM to the CMTS in the upstream direction. The Ethernet frame is encapsulated by the CM 78 in a DOCSIS MAC frame and sent to the CMTS 82. The CMTS 82 can be either a router or a bridge. In either case, the CMTS 82 de-encapsulates the Ethernet frame and forwards it upstream.

In the protocol stack of FIG. 3, the term "public net" indicates that the IP layer 120 uses the public IP address 106 allocated to the home computer 70. The term "net 10" indicates that the IP layer 118 uses the restricted IP address allocated to the home computer by the DHCP server 86. The term "Local LAN" means the private LAN of the RDC 90, which includes the connection server 110 and the router 98 that connects the RDC to the ISP 96. The PPTP layer 126 is for communication through the PPTP tunnel 102 established between the home computer and the connection sever 110 of the MSO.

Figure 4:
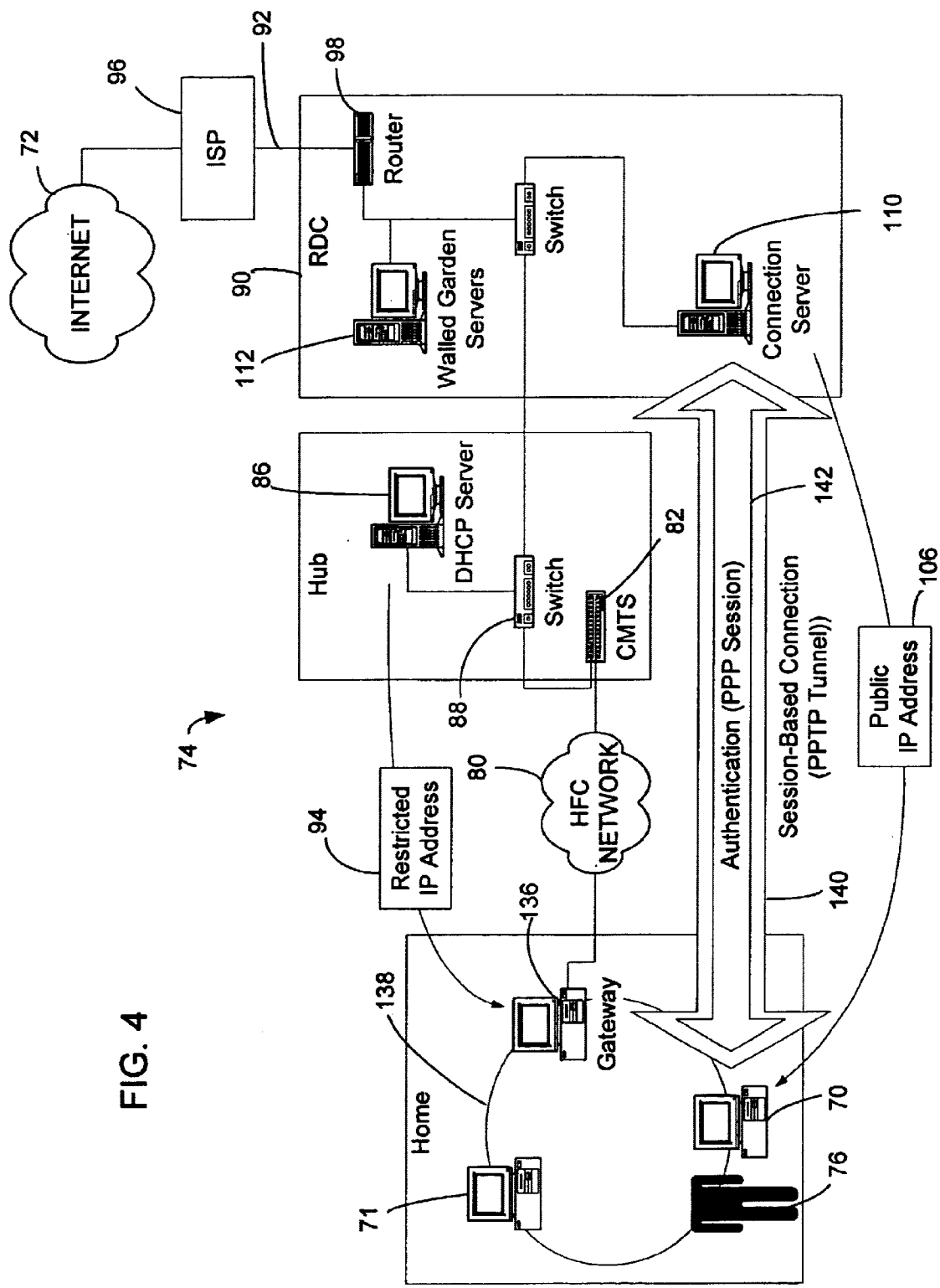
FIG. 4 is a schematic diagram showing an alternative embodiment of the login architecture of the invention for providing Internet access to computers in a local area network ("LAN")

As mentioned above, the login architecture can also be implemented in an embodiment where the home computers are connected to each other by a local area network ("LAN") and connected to the cable network 74 through a gateway computer. In this arrangement as illustrated in FIG. 4, the gateway computer 136 performs the function of network address translation ("NAT") on communications between a computer on the home LAN 138 and an external network. The gateway computer 136 may be, for example, a personal computer. It will be appreciated, however, that the gateway computer does not have to be a full-fledged computer with conventional input/output devices but may be a microprocessor-based device on a simpler platform. For example, the gateway computer 136 may be a set-up box or a standalone cable modem running a simplified operating system, such as the Windows CE operating system of Microsoft Corporation.

In a preferred embodiment where the session-based connection is a PPTP tunnel, the network address translation ("NAT")is implemented on the gateway computer to pass PPTP communication packets through the use of the Internet Generic Routing Encapsulation ("GRE") protocol. For establishing connection to the cable network 74, the gateway device 136 preferably has an internal cable modem. Alternatively, an external cable modem can be used. The NAT gateway computer 136 receives a restricted IP address 94 from the DHCP server 86 of the cable system. As described above, the restricted IP address, which may not be used for Internet access, may allow the home users to reach a "walled garden" or may provide no access at all without logging in first. Within the home LAN 138, each computer is assigned a private IP address usable only for network communication within the home LAN. Any communication between a home computer 70 and an external network, such as the cable network, goes through the gateway computer 136 and requires the gateway computer to perform the network address translation function to map the source IP address for external communication to the private IP address of the home computer.

Figure 5:
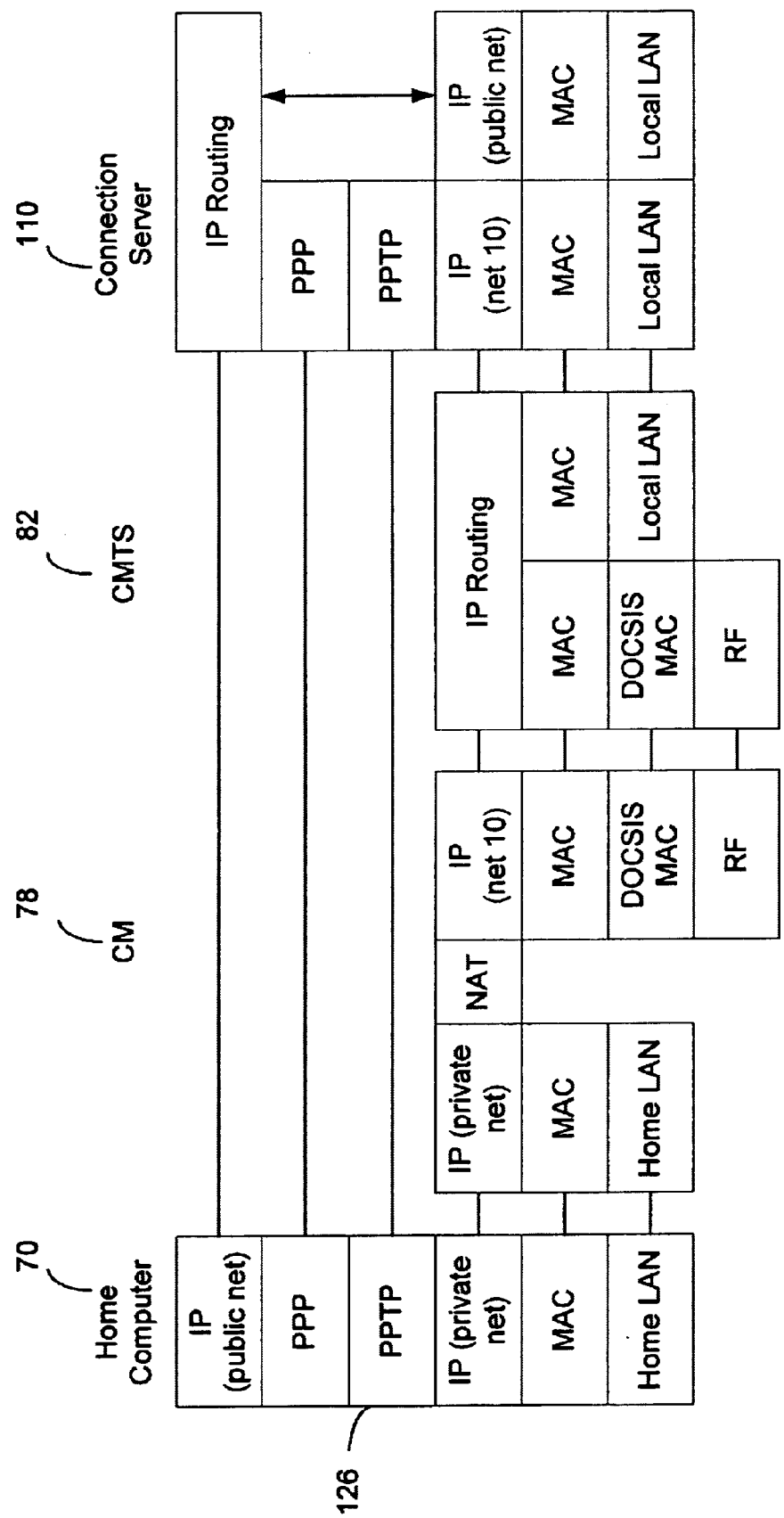
FIG. 5 is a schematic diagram showing protocol stacks for transmitting network communication packets through the cable system of FIG. 4.

In such an environment, the login architecture of the invention can be implemented based on either a per-user account or a single "home" account. FIG. 4 shows an implementation for the per-user account mode that establishes the session-based connection to the connection server under the PPTP protocol. In this embodiment, a PPTP tunnel is created each time a user logs in. Specifically, when a user 76 in the home wants to access a resource on the Internet 72, she uses the home computer 70 to create a PPTP tunnel 140 from the home computer to the connection server 110 in the RDC 90. Over this PPTP tunnel 140, a PPP session 142 is formed, over which the connection server 110 authenticates the user 76 based on, for example, her username and password. When the user is authenticated, the connection server 110 assigns a public IP address to the user's computer 70. Subsequently, Internet communication packets constructed by the user's computer 70 using the public IP address are passed through the PPTP tunnel 140 to the connection server 110. For communications through the PPTP tunnel 140, the gateway computer 136 translates the source IP address of the PPTP tunnel from the private address of the computer to the restricted IP address assigned to the gateway computer. The data traffic sent within the PPP session 142 itself is passed transparently across the gateway computer. The NAT does not see that public IP address assigned to the computer 70 as it is hidden within the GRE tunnel. The NAT only sees the "external" or "lower" IP address of the session, which is the restricted IP address the DHCP server assigned to the computer 70. The protocol stack for this per-user account mode is shown in FIG. 5. Since the PPTP tunnel 140 begins at the user's computer 70 in this mode, the PPTP layer 126 is included in the stack at the user's computer 70.

Figure 6:
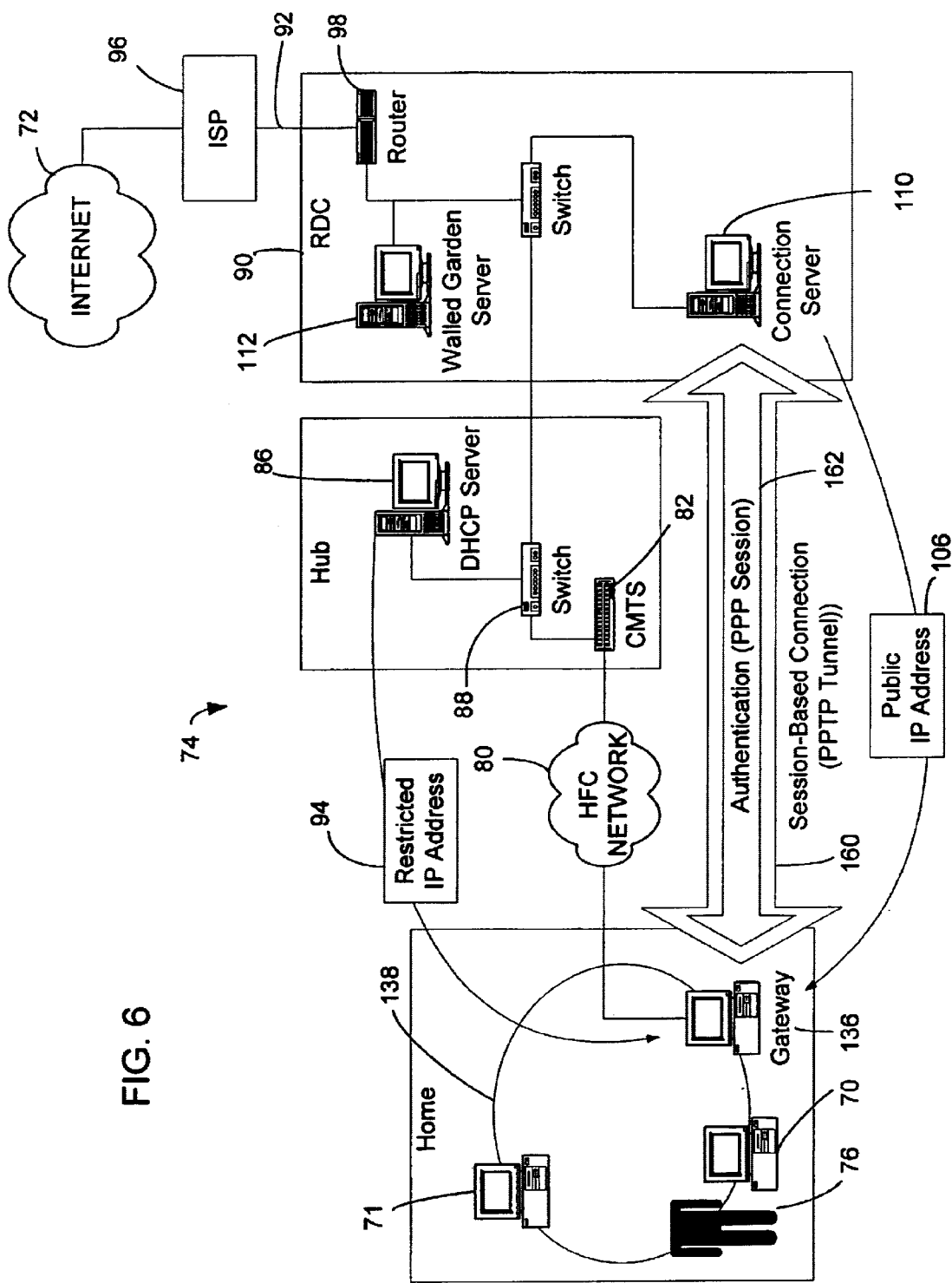
FIG. 6 is a schematic diagram showing another alternative embodiment of the login architecture of the invention for providing Internet access through a cable system to computers in a local area network on a single-account basis.
Figure 7:
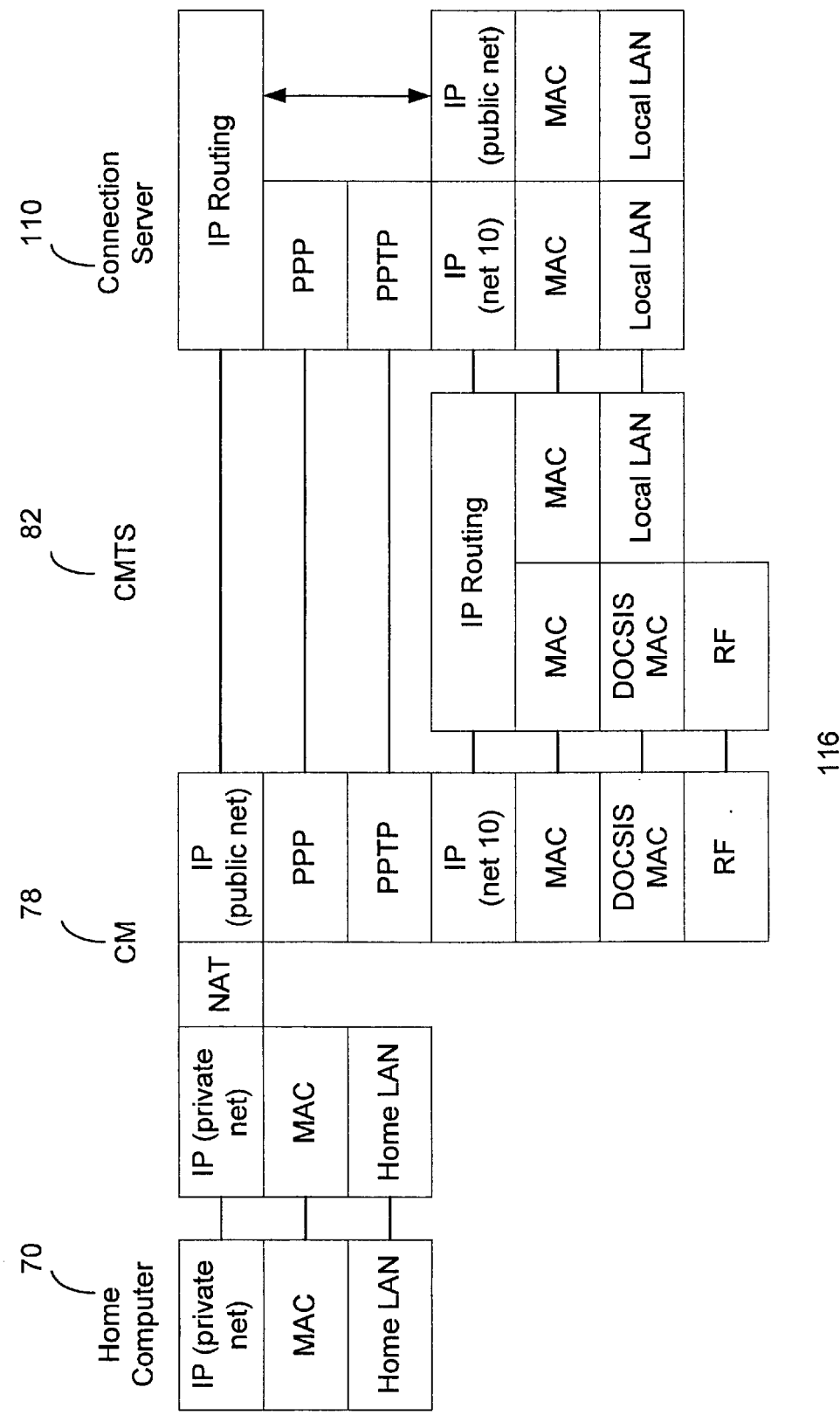
FIG. 7 is a schematic diagram showing protocol stacks for transmitting network communication packets through the cable system of FIG. 6.

An embodiment that operates in the home account mode is illustrated in FIG. 6. In this embodiment, only one account is required for all the users in the home LAN. This account is set on the gateway machine 136, and the account's login information (e.g., the user name and password) applies to the gateway computer and represents all the users in the home. The gateway computer 136 is assigned a restricted IP address by the DHCP server 86 in the cable network. When a user 76 in the home wants to access the Internet 72, the gateway computer 136 auto-dials a PPTP tunnel 160 from the gateway computer to the PPTP server 136 in the RDC 90. The login information, such as the user name and password stored on the gateway computer, is then used for authentication. After the gateway computer 136 is authenticated, a public IP address is allocated to the gateway computer. All the users and the computers in the home LAN 138 can then access the Internet through the PPTP tunnel 160 established between the gateway computer 136 and the connection server 110 of the RDC 90. The source IP address of any traffic sent by a computer in the home LAN through the tunnel is translated by the gateway computer to the public IP address and the traffic is sent through the PPTP tunnel to the connection server. The protocol stack for this home-account mode is illustrated in FIG. 7.

One significant advantage of the login architecture is that the access to the Internet (or another external computer network) is session-based. Each time a user wants to access the Internet through the cable system, she has to login to establish a session with the MSO, and then accesses the Internet within that session. The session-based Internet access enables efficient allocation of public IP addresses by allocating them on a need-to-use basis. A user's computer is allocated a public IP address only for a session for Internet access. When the session is terminated either because the user logs off or because a timeout period has expired, the public IP address is released and can be reallocated to other computers.

Another significant advantage of the login architecture is the ability of the MSO to authenticate the user. In the embodiments where access to the Internet (or another external computer network) requires a per-user account, the MSO can learn the identity of the user for each session. This knowledge of who is using the cable system for accessing the Internet enables the MSO to sell tiered services targeted to individual users. For instance, a filter may be implemented at the RDC to prevent access to certain sites of the World Wide Web if the user is a minor.

For illustration purposes, the embodiments described above are directed to the scenarios where the computers that use the cable network to access the Internet (or another external computer network) are home computers. It will be appreciated, however, that the login architecture of the invention is not limited to home computers. For example, the login architecture may also be employed where the cable network is used to provide Internet access to computers in a corporation, especially in the Small Office/Home Office ("SOHO") environment. Similar to the case of home computers, the computers in the corporation may or may not be part of a LAN of the corporation, and the connection to the Internet through the cable system may require a per-user account or a single corporate account. The three implementations described above in connection with home computers can be applied to corporate computers simply by replacing the home computers with the corporate computers.

It will also be appreciated that the login architecture is applicable where the cable system is used to provide connectivity to an external computer network other than the Internet. For example, the computer network to be accessed may be a subnet of the cable system owned by the MSO and containing game servers or other special servers. The login architecture of the invention may be employed to check whether the user has purchased access to the game servers. If the user is permitted to access the service, the computer is then given a network address that allows network traffic to be routed to and from the subnet containing the games servers. In such a case, the network address allocated to the computer after user authentication does not have to be a public Internet address and is only required to be routable to the computer network containing the special servers.

Figure 8:
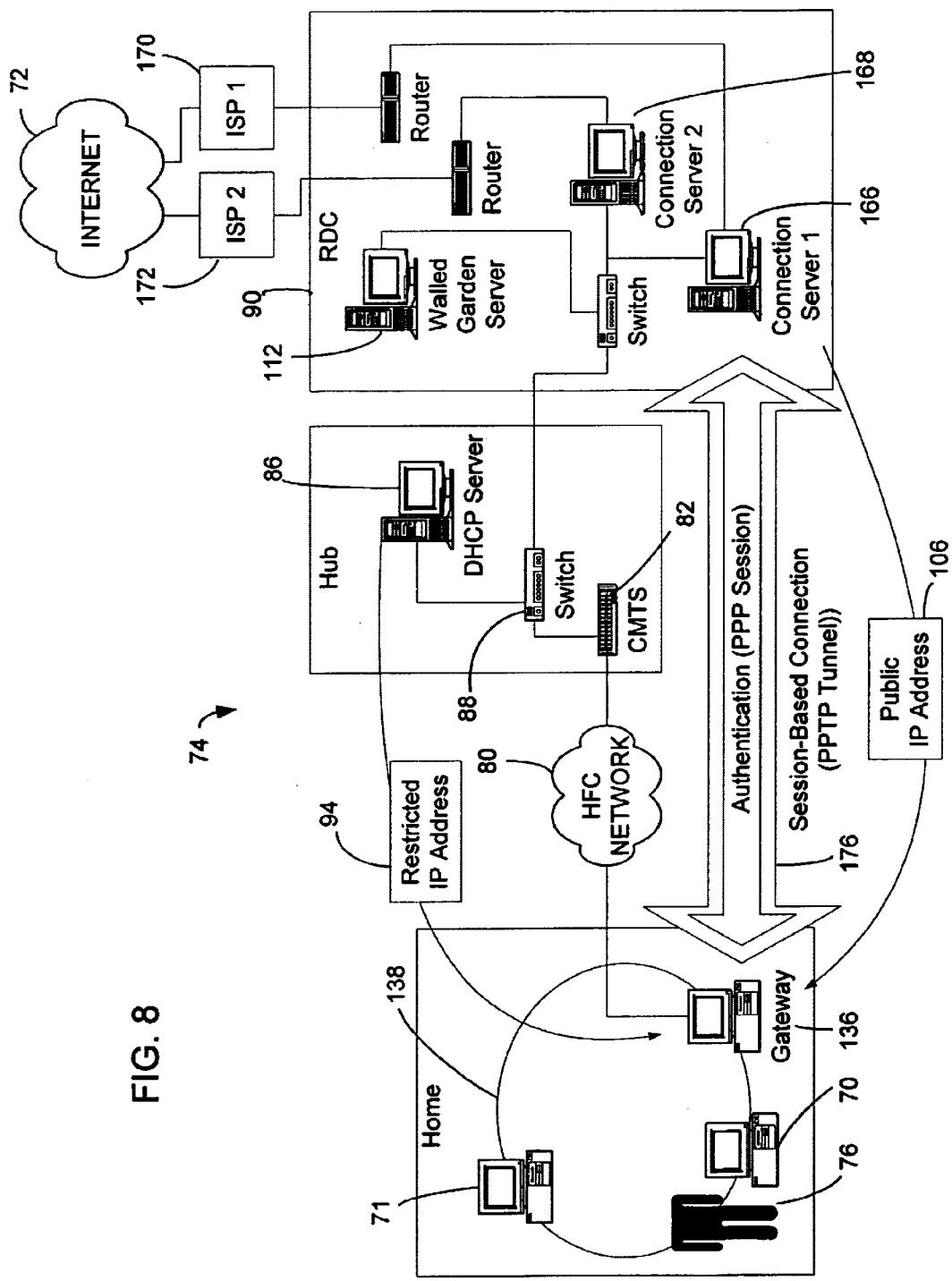
FIG. 8 is a schematic diagram showing another embodiment of the login architecture of the invention that provides connection to the Internet through multiple Internet service providers ("ISPs").

In the case where the cable network is used to provide connectivity to the Internet, a further significant advantage of the login architecture is the flexibility of the MSO to offer Internet connectivity through different Internet service providers (ISPs). In one embodiment, this selection of the ISPs is provided by using a plurality of connection servers. For each ISP offered, there is one or more connection servers connected thereto. By way of example, FIG. 8 shows an embodiment in which the RDC 90 has two connection servers 166, 168. One connection server 166 is for Internet connection through a first ISP 170, and the other connection server 168 is for Internet connection through a different ISP 172. In the embodiment of FIG. 8, the home computers form a LAN 138 with a gateway computer 136. The selection of one of the ISPs 170, 172 for Internet access is made by establishing a PPTP tunnel to the connection server associated with the selected ISP during the login process. For example, if the home LAN 138 has a signal account and the user wants to use the first ISP 170 for Internet access, she can set up the gateway computer 136 to form a PPTP tunnel 176 with the connection server 166 for logging in. The network traffic sent by the user to the Internet is then passed through the PPTP tunnel 176 to the connection server 166, which then forwards the traffic through the ISP 170 to the Internet.

In view of the foregoing, it can be seen that the present invention provides a login architecture for accessing the Internet or other computer networks through the broadband data transmission of a cable system. The login architecture enables a cable company to offer connectivity to a computer network in well-defined sessions and to authenticate the user for each session. As a result, the cable company can achieve efficient allocation of public IP addresses, which are a valuable resource, and to offer tailored services based on the user identity. The login architecture of the invention further enables the cable company to offer Internet connectivity through different Internet service providers.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing steps for a computer to access a computer network through a cable system, comprising:

establishing a session with a connection server of the cable system using a first network address of the cable system;

providing authentication information within the session to the connection server;

receiving a second network address routable through the computer network;

constructing network packets using the second network address for communication with the computer network; and transmitting the network packets to the connection server within the session with the connection server for forwarding to the computer network.

2. A computer-readable medium as in claim 1, wherein the computer network is a wide-area network.

3. A computer-readable medium as in claim 2, wherein the wide-area network is the Internet, and the second network address is a public network address routable through the Internet.

4. A computer-readable medium as in claim 3, wherein the session is a tunnel formed under the Point-to-Point Tunneling Protocol.

5. A computer-readable medium as in claim 4, wherein the step of providing authentication information includes forming a Point-to-Point Protocol session within the tunnel and sending the authentication information in the Point-to-Point Protocol session.

6. A computer-readable medium as in claim 1, wherein the authentication information includes login data of a user of said computer.

7. A computer-readable medium as in claim 1, wherein said computer is a gateway computer of a local area network, and wherein the step of constructing network packets includes receiving original network packets from a second computer on the local area network, and performing network address translation on the received original network packets to form said network packets for transmission to the connection server with the session.

8. A computer-readable medium as in claim 1, wherein the step of transmitting the network packets includes sending the network packets to a gateway computer connected to the cable network to perform network address translation on the network packets.

9. A method of connecting a computer to an external computer network through a cable system, comprising the steps of:

establishing a session with a connection server of the cable system using a first network address of the cable system;

providing, by the computer within the session, authentication information to the connection server;

sending, by the connection server after verifying the authentication information, to the computer a second network address routable through the external computer network;

constructing, by the computer, network packets using the second network address for communication with the external computer network; and transmitting, by the computer within the session with the connection server, the network packets to the connection server for forwarding to the external computer network.

10. A method as in claim 9, wherein the external computer network is the Internet.

11. A method as in claim 9, wherein the step of establishing the session with the connection server creates a tunnel to the connection server under the Point-to-Point Tunneling Protocol.

12. A method as in claim 11, wherein the step of providing authentication information includes forming a Point-to-Point Protocol session within the tunnel and sending the authentication information in the Point-to-Point Protocol session.

13. A method as in claim 9, wherein the authentication information includes login data of a user of said computer.

14. A method as in claim 9, wherein said computer is a gateway computer of a local area network, and wherein the step of constructing network packets includes receiving original network packets from a second computer on the local area network, and performing network address translation on the received original network packets to form said network packets for transmission to the connection server.

15. A method as in claim 9, wherein the step of transmitting the network packets includes sending the network packets to a gateway computer connected to the cable network, and performing, by the gateway computer, network address translation on the network packets.

16. A cable system for connecting a home computer to an external computer network, comprising:

a private computer network; and cable media connecting the home computer to the private computer network;

the private computer network including a connection server and an address allocation server, the address allocation server allocating a restricted network address to the home computer for accessing the private computer network and a public network address for accessing the external computer network; the connection server connected to a network service provider for providing connectivity to the external computer network and programmed for establishing a communication tunnel with the home computer, receiving authentication information from the home computer through the communication tunnel, assigning and sending a public network address to the home computer for accessing the external computer network, receiving network packets using the public network address sent by the home computer through the communication tunnel, and forwarding the network packets to the external computer network.

17. A cable system as in claim 16, wherein the external computer network is the Internet.

18. A cable system as in claim 16, wherein the private computer network further includes a second connection server connected to a second network service provider for connectivity to the external computer network.

19. A computer-readable medium having computer-executable instructions for performing steps by a connection server of a cable system to connect a computer to an external computer network through a cable network of the cable system, comprising:

establishing a session with the computer over the cable network, the session initiated by the computer using a restricted network address of the cable system allocated to the computer;

receiving authentication information within the session from the computer;

assigning to the computer, after verifying the authentication information, a public network address routable through the external computer network;

receiving from the computer within the session established therewith packets using the public network address for communication with the external computer network; and forwarding the network packets to a network service provider of the external computer network.

20. A computer-readable medium as in claim 19, wherein the external computer network is the Internet.

21. A computer-readable medium as in claim 20, wherein the session with the computer is a tunnel formed under the Point-to-Point Tunneling Protocol.

22. A computer-readable medium as in claim 21, wherein the step of receiving authentication information includes forming a Point-to-Point Protocol session with the computer within the tunnel and receiving the authentication information in the Point-to-Point Protocol session.

23. A computer-readable medium as in claim 19, wherein the authentication information includes login data of a user of said computer.

* * * * *